United States Patent
Ochs et al.

(10) Patent No.: US 10,237,262 B2
(45) Date of Patent: *Mar. 19, 2019

(54) ASSEMBLY MANAGER

(71) Applicant: Passport Health Communications, Inc., Franklin, TN (US)

(72) Inventors: Michael Peter Ochs, Franklin, TN (US); Edmond Chase Pilkington, Rockvale, TN (US); Thomas Ryan Sears, Franklin, TN (US); David Stephen Phoebus, Nashville, TN (US)

(73) Assignee: PASSPORT HEALTH COMMUNICATIONS, INC., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,816

(22) Filed: Dec. 18, 2017

(65) Prior Publication Data

US 2018/0212943 A1    Jul. 26, 2018

Related U.S. Application Data

(62) Division of application No. 14/850,607, filed on Sep. 10, 2015, now Pat. No. 9,847,985.

(60) Provisional application No. 62/049,693, filed on Sep. 12, 2014.

(51) Int. Cl.
| | | |
|---|---|---|
| *H04L 29/06* | (2006.01) | |
| *G06F 17/30* | (2006.01) | |
| *H04L 29/08* | (2006.01) | |
| *G06F 8/41* | (2018.01) | |
| *G06F 8/60* | (2018.01) | |
| *G06F 8/71* | (2018.01) | |

(52) U.S. Cl.
CPC ............ *H04L 63/08* (2013.01); *G06F 8/41* (2013.01); *G06F 8/60* (2013.01); *G06F 8/71* (2013.01); *G06F 17/30864* (2013.01); *H04L 67/20* (2013.01); *H04L 67/34* (2013.01)

(58) Field of Classification Search
CPC .................................................... H04L 63/08
USPC .............................................................. 726/4
See application file for complete search history.

(56) References Cited

U.S. PATENT DOCUMENTS

| | | | | |
|---|---|---|---|---|
| 7,058,978 B2* | 6/2006 | Feuerstein | ............... | G06F 21/55 705/26.35 |
| 9,847,985 B2 | 12/2017 | Ochs et al. | | |
| 2012/0166983 A1* | 6/2012 | Demant | .................... | G06F 8/38 715/764 |

* cited by examiner

Primary Examiner — Longbit Chai
(74) Attorney, Agent, or Firm — Merchant & Gould

(57) ABSTRACT

An assembly management system allows a software service provider (SSP) to compile and upload client-specific client application code into a repository. The SSP deploys a client application comprising non-client-specific code to various clients. When a user logs in, a call is made to a web service, which queries the repository for code specific to the requesting client. If available, the web service sends a response with the name and version of the assembly to which the client is subscribed. If the locally-saved version does not match the version of the assembly in the repository, and if the SSP has permission to write to the client's disk, the web service retrieves the assembly and commits it to the disk. If the SSP does not have permission, the assembly is streamed to the client device and retained and executed in memory for the duration of the login.

20 Claims, 6 Drawing Sheets

ASSEMBLY MANAGER

RELATED APPLICATIONS

This application is a divisional of U.S. patent application Ser. No. 14/850,607 filed on Sep. 10, 2015, and issued as Pat. No. 9,847,985, which claims the benefit of U.S. Provisional Application No. 62/049,693 filed Sep. 12, 2014, which are hereby incorporated by reference in their entirety.

BACKGROUND

Some software service providers offer software applications to clients that are customized to each client. For example, one way that software service providers are able to provide client-customized applications is by providing application code that is shared to all clients and additionally providing client-specific code that is specific to a given client. Accordingly, the code at a client-by-client level may be very different.

When deploying an application or updates to various clients, the software service provider may be provided with two options: either a universal installation to all clients that contains the client-agnostic code and each client's client-specific code, or a client-specific installation where a different deployment containing the client-agnostic code and the client's client-specific code is made for each client. With the universal installation option, all clients' client-specific code may be included in the deployment. Although transparent to the clients, each client is installing code that are irrelevant and extraneous because they are specific to different clients. Additionally, because a universal deployment includes every client's code, regression testing of the code can be costly and time consuming. Accordingly, such a deployment may be very large, costly, and unnecessary. As can be appreciated with the client-specific installation, client-specific deployments may entail a large number of deployments depending on the number of clients. A client-specific deployment to each client can be difficult to manage from a support perspective, and may be resource-intensive and time-intensive.

Additionally, some clients may use a third party server, wherein the software service provider may not have the rights or permissions to update applications on the third party's servers. Accordingly, updates may be reliant on the client's information technology (IT) department or on the third party's IT department, which may take days to weeks for the deployment to be scheduled and to be performed.

SUMMARY

Various aspects of an assembly management system allow a software service provider to compile client-specific client application code, version the client-specific code, and upload the client-specific code into a repository. A deployment of a client application to each client comprising the general application code (i.e., non-client-specific code) may be performed. Once the general client application code is deployed on a client device and when a user logs into the client application, a call is made to a web service, which queries the repository for application code specific to the requesting client application. If a client-specific assembly is stored in the repository, the web service retrieves the assembly, and sends a response to the client application with the name of the assembly and the version to which the client is subscribed. If the version on the client device does not match the version of the assembly retrieved from the repository, and if the software service provider has permission to write to the client's disk, the retrieved assembly is downloaded and written to the client device disk. If the software service provider does not have permission to write to the client's disk, the assembly is streamed to the client device and retained and executed in memory for the duration of the login.

Deploying client specific assemblies of code as described herein enables practitioners of the present disclosure to overcome a problem specific to computers. By having client specific assemblies, fewer memory resources are used by clients and providers, and improvements in the speed, flexibility, and efficiency in which the deployment of such assemblies may be realized.

BRIEF DESCRIPTION OF DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

An assembly management system and method is described herein and illustrated in the accompanying figures. The assembly management system provides client-specific code used by a client application of a requesting client to the requesting client. The client-specific code may either be executed in the client's memory for the duration of the login or committed to the client's disk and used as long as the version in the client's subscription matches the locally-stored version. Deploying client specific assemblies of code as described herein enables practitioners of the present disclosure to overcome a problem specific to computers. By having client specific assemblies, fewer memory resources are used by clients and providers, and improvements in the speed, flexibility, and efficiency in which the deployment of such assemblies may be realized.

Figure 1:
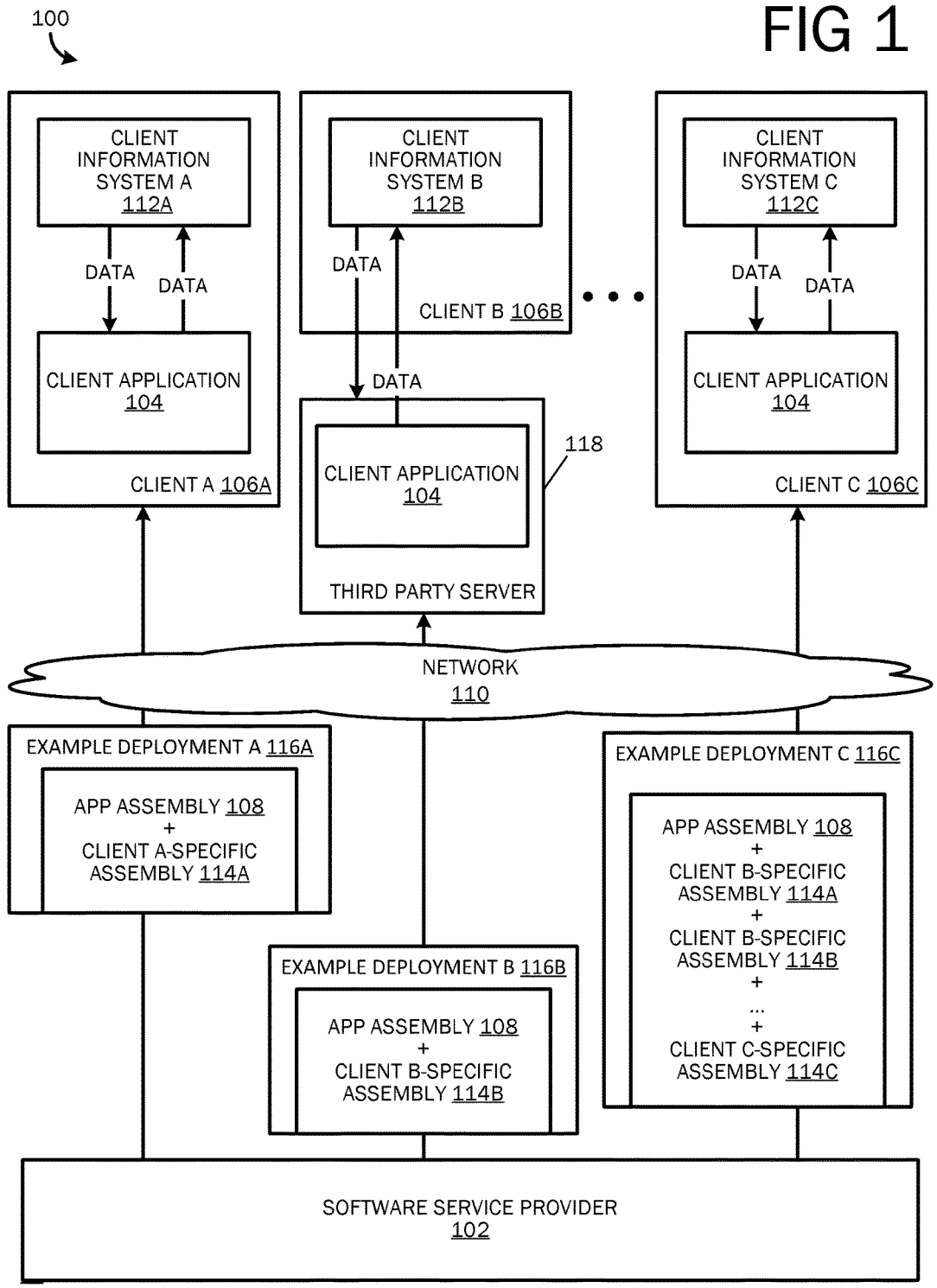
FIG. 1 illustrates an example of several application deployment scenarios.

Referring now to FIG. 1, an example 100 of several application deployment scenarios is illustrated. An software service provider 102 is illustrative of a provider of one or more applications, for example, client application 104, to one or more clients 106A-C (collectively 106). The client application 104 may be provided over a network 110, such as the Internet. In some organizations, a client 106 may use the client application 104 as an interface to another application. For example, in a healthcare provider system, the client application 104 may be an add-on interface to the healthcare provider's (i.e., the client's) registration systems 112A-C (collectively 112). Accordingly, for each healthcare provider or client 106, the client application 104 may need to be compliant with, and catered to, the given healthcare provider's registration system 112. As should be appreciated, the healthcare provider scenario is but one example of a use case scenario and should not be construed as limiting to the vast number of environments in which embodiments of the present disclosure may be utilized.

The software service provider 102 is able to provide client-specific client applications 104 to each of its clients 106 by providing the non-client specific application code (i.e., client-agnostic application code for the application assembly 108) and additionally providing client-specific code compiled into an assembly (i.e., client-specific assemblies 114A-C, collectively 114). The application assembly 108 is operable to provide shared features to each client 106 using the client application 104 and may be a standalone version of the client application 104, but may be enhanced, customized, or simplified by the addition of one or more client-specific assemblies 114.

When deploying the client application 104 or updates to the client application 104 to various clients 106, the software service provider 102 may perform a universal installation to clients 106 that contains the code of the application assembly 108 and each client's client-specific assembly 114A-C (illustrated as example deployment C 116C), or a client-specific installation where a different deployment containing the code of the application assembly 108 and the code of the client's client-specific assembly 114 is made for each client 106 (illustrated as example deployment A 116A and example deployment B 116B). With the universal installation in example deployment 116C, every clients' client-specific assembly 114A-C may be included in the deployment 116. Although transparent to the clients 106, each client 106 is installing code that are irrelevant and extraneous because they are specific to different clients, which may increase download time and memory requirements for all clients 106 with no specific benefit to an individual client 106.

Client-specific deployments 116A,B may entail a large number of deployments depending on the number of clients 106. A client-specific deployment 116A,B to each client 106 can be difficult to manage from a support perspective, and may be resource-intensive and time-intensive. Additionally, some clients 106B may use a third party server 118 on to which the software service provider 102 may not have the rights or permissions to update applications. Accordingly, updates may be reliant on the client's information technology (IT) department or on the third party's IT department, which may take days to weeks for the deployment 116A,B to be scheduled and to be performed.

As can be appreciated, the above methods of deployment 116A-C are not ideal. Aspects of the assembly management system of the present disclosure may be used to conserve memory, reduce network traffic, reduce processor load, and improve the software service provider's 102 efficiency in providing client-specific application updates to clients 106.

Figure 2:
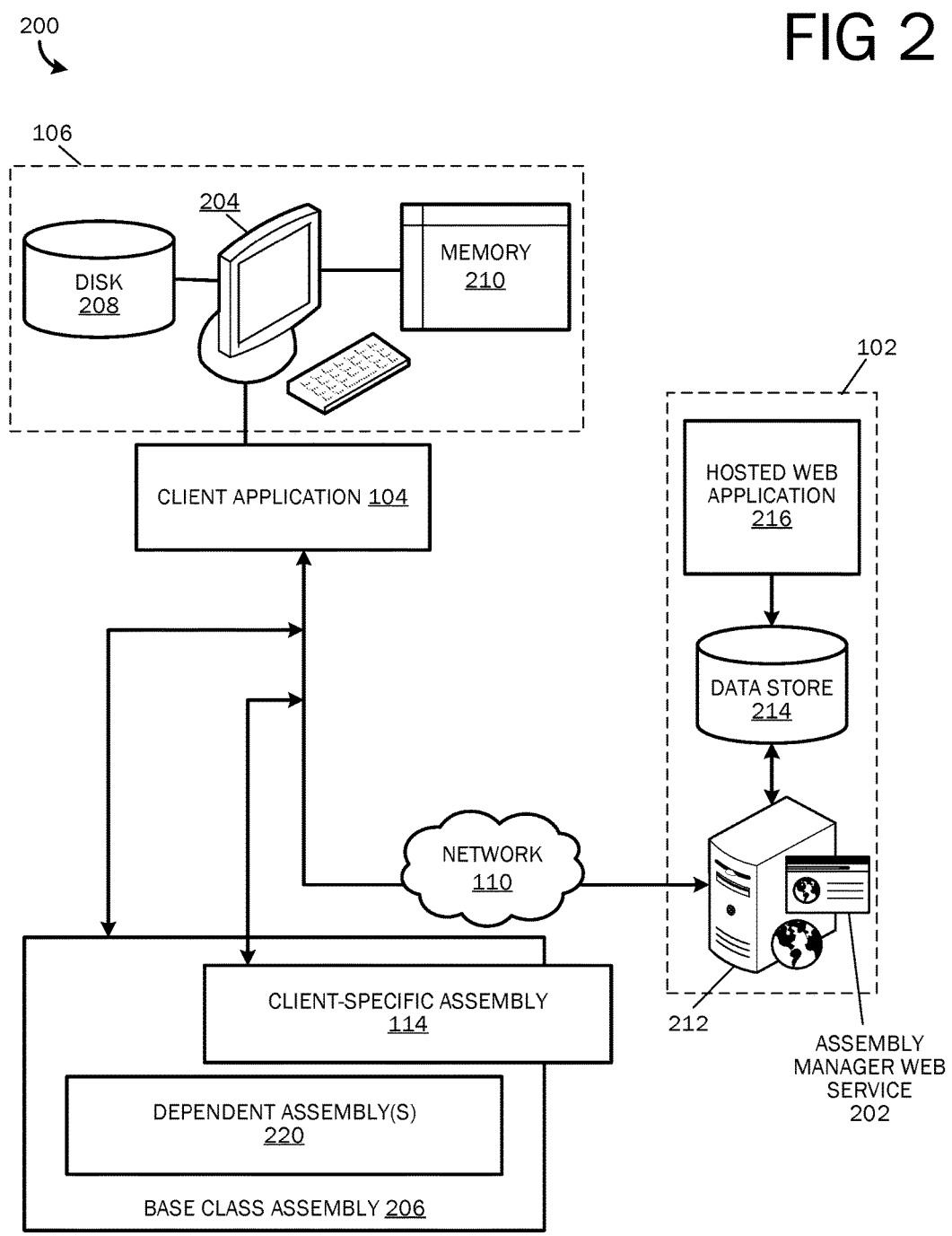
FIG. 2 is a simplified block diagram of a high-level system architecture.

FIG. 2 illustrates an example of a high-level system architecture 200, which may provide a suitable operating environment for the assembly management system. The high-level system architecture 200 may comprise a client computing device 204, which may be one of various types of computing devices (e.g., a desktop computer, a tablet computing device, a mobile communication device, a laptop computer, a laptop/tablet hybrid computing device, or other type of computing device) for executing applications for performing a variety of tasks, for example, client application 104. According to one example, the client computing device 204 may be a personal computer of a registrar used in registering patients in a healthcare registration process.

The client application 104 may be a thick client application stored locally on the client computing device 204, or may be a thin client application residing on a local or a remote server and accessible over a network 110, such as the Internet or an intranet. According to an aspect, functionality of the client application 104 may be provided by one or more loadable components, for example, assemblies 206, 220, 114 comprised of dynamic link libraries (DLLs). The assemblies 206, 220, 114 may include functions, classes, variables, user interfaces (UIs), and resources (e.g., icons, images, files, etc.) that the client application 104 or another DLL uses.

The assemblies 206, 220, 114 may comprise a base class assembly 206 that is running inside the client application 104 and is referenced by the client application 104, a client-specific assembly 114 that includes scripting DLLs specific to a given client 106 and inherits from the base class assembly 206, and may optionally comprise one or more dependent assemblies 220 (i.e., tools that, depending on the client's information system 112, may be used to help interact with the client's information system 112).

Referring still to FIG. 2, the hosted web application 216 is illustrative of an application service provider-based portal via which compiled code, such as client-specific assemblies 114, may be uploaded. According to an aspect, client-specific assemblies 114 may be versioned. Clients 106 may be subscribed to a version of the client-specific assembly 114 at various levels, for example, a user, facility, or trading partner level. Uploaded client-specific assemblies 114 may be stored in a data store 214. Although illustrated as a single data store 214, the data store 214 may be one of a plurality of databases.

In the illustrated aspect, the assembly management system includes a web server 212 running an assembly manager web service 202 that accepts web service calls from the client application 104. Although illustrated as a single web server 212 and web service 202, the system may comprise a plurality of web servers 212 and web services 202. According to an aspect, the client application 104 is operable to call the web service 202 to request a response on whether a client-specific assembly 114 for the requesting client 106 is stored in the data store 214, and if it is, the name and version of the stored client-specific assembly 114. In other aspects, the client application 104 is operable to request a latest-released version of the client-specific assembly 114 or a limited-released version of a stored client-specific assembly 114, for example, as legacy version or a pre-release version. The web service 202 receives the request, and if a client-specific assembly 114 for the requesting client 106 is stored in the data store 214, the web service 202 obtains the name and the version of the stored client-specific assembly 114 for the requesting client 106 (e.g., from the data store 214). The web service 202 may then return the name and the version of the stored client-specific assembly 114 to the client application 104 as a response to the web service call.

If the name and version of the client-specific assembly 114 provided in the response does not match the name and the version of the client-specific assembly 114 stored locally (e.g., on the client computing device 204), the client-specific assembly 114 stored in the data store 214 is retrieved by the web server 212 through the network 110 via the web service call. As will be understood, examples using the client's disk 208 shall also apply to a disk 208 used by the client 106 provided by a third party server 118 hosting the client application 104 for a client 106. According to an aspect, if the software service provider 102 has permission to write new files to the client computing device 204, the retrieved client-specific assembly 114 is committed to the client's disk 208. The client's disk 208 may be any memory device used by the client computing device 204 for long term storage (e.g., a magnetic hard drive, a solid state drive (SSD), flash memory card, magnetic tape, optical storage device, etc.). As long as the saved version is the current version, for example, as determined by the web service call, the client application 104 will use the locally saved client-specific assembly 114. According to another aspect, if the software service provider 102 does not have permission to write new files to the client computing device 204, the retrieved client-specific assembly 114 is streamed in binary and is retained and executed in memory 210 for the duration of the login without committing the assembly to disk 208. The memory 210 may be any memory used by the client computing device 204 for short term storage (e.g., ROM, RAM, a temporary cache on the client's disk 208, etc.). Once the client user logs out, the client-specific assembly 114 is not retained in memory 210, and may be erased.

According to an aspect, the one or more dependent assemblies 220 may be compiled and uploaded into the data store 214 via the hosted web application 216. The client application 104 may be further operable to call the web service 202 to request a response on whether one or more dependent assemblies 220, for example, one or more assemblies or DLLs referenced by a client-specific assembly 114, for the requesting client 106 are stored in the data store 214. If a dependent assembly 220 is available, the client application 104 may request a response on the name and version of the stored dependent assembly 220. The web service 202 receives the request, and if the dependent assembly 220 for the requesting client 106 is stored in the data store 214, the web service 202 obtains the name and the version of the stored dependent assembly 220 for the requesting client 106 (e.g., from the data store 214). The web service 202 may then return the name and the version of the stored dependent assembly 220 to the client application 104 as a response to the web service call.

If the name and version of the dependent assembly 220 provided in the response does not match the name and the version of the locally-saved one or more dependent assemblies 220, e.g., on the client computing device 204, the dependent assembly 220 stored in the data store 214 is retrieved by the web server 212 through the network 110 via the web service call. According to an aspect, if the software service provider 102 has permission to write new files to the client computing device 204, the retrieved dependent assembly 220 is committed to the client's disk 208. As long as the saved version is the current version, for example, as determined by the web service call, the client assembly will use the locally saved dependent assembly 220. According to another aspect, if the software service provider 102 does not have permission to write new files to the client computing device 204, the retrieved dependent assembly 220 is streamed in binary and is retained and executed in memory 210 for the duration of the login without committing the assembly to disk 208. Once the client user logs out, the dependent assembly 220 is not retained in memory 210, and may be erased.

Aspects of the present disclosure may additionally be used for client-level testing prior to deployments at the facility or trading partner levels. For example, when scripting code (client-specific assembly 114) is deployed into the data store 214, specific versions of the code can be subscribed at the user level. This allows for a software service provider 102 scripting developer to compile a change, deploy the change through the hosted web application 216, and subscribe a particular client user to the new change such that only the particular client user would be able to stream down the given version of the assembly. The code can be tested by the client user before it is made available at the facility or trading partner levels. As can be appreciated, deploying and testing code at the client user level can result in a faster turn-around time for deployments, less extensive regression testing, and less costly client-specific assembly deployment.

The various subscription levels described herein enable the provision of different code sets to client users within the same facility or region. A client user may specify one of more subscription levels when logging in that are used to determine the client-specific assemblies 114, and which versions thereof, to be provided for the client user. When a client user logs in, at least one subscription level is specified and the associated client-specific assemblies 114, if any are available, are applied to the base class assembly 206 to modify its functionality. For example, a client user who is an IT professional at multiple facilities in a region may log in at a first facility and specify a facility subscription level associated with the first facility to receive a first client-specific assembly 114, and log in at a second facility and specify a facility subscription level associated with the second facility to receive a different client-specific assembly 114. Similarly, the IT professional may specify a user level subscription when logging in at either facility that would either provide different versions of the facility-associated client-specific assemblies 114 (e.g., test, admin, or "safe" versions of the associated client-specific assemblies 114) or a different client-specific assembly 114 that is associated with the client user.

Figure 3:
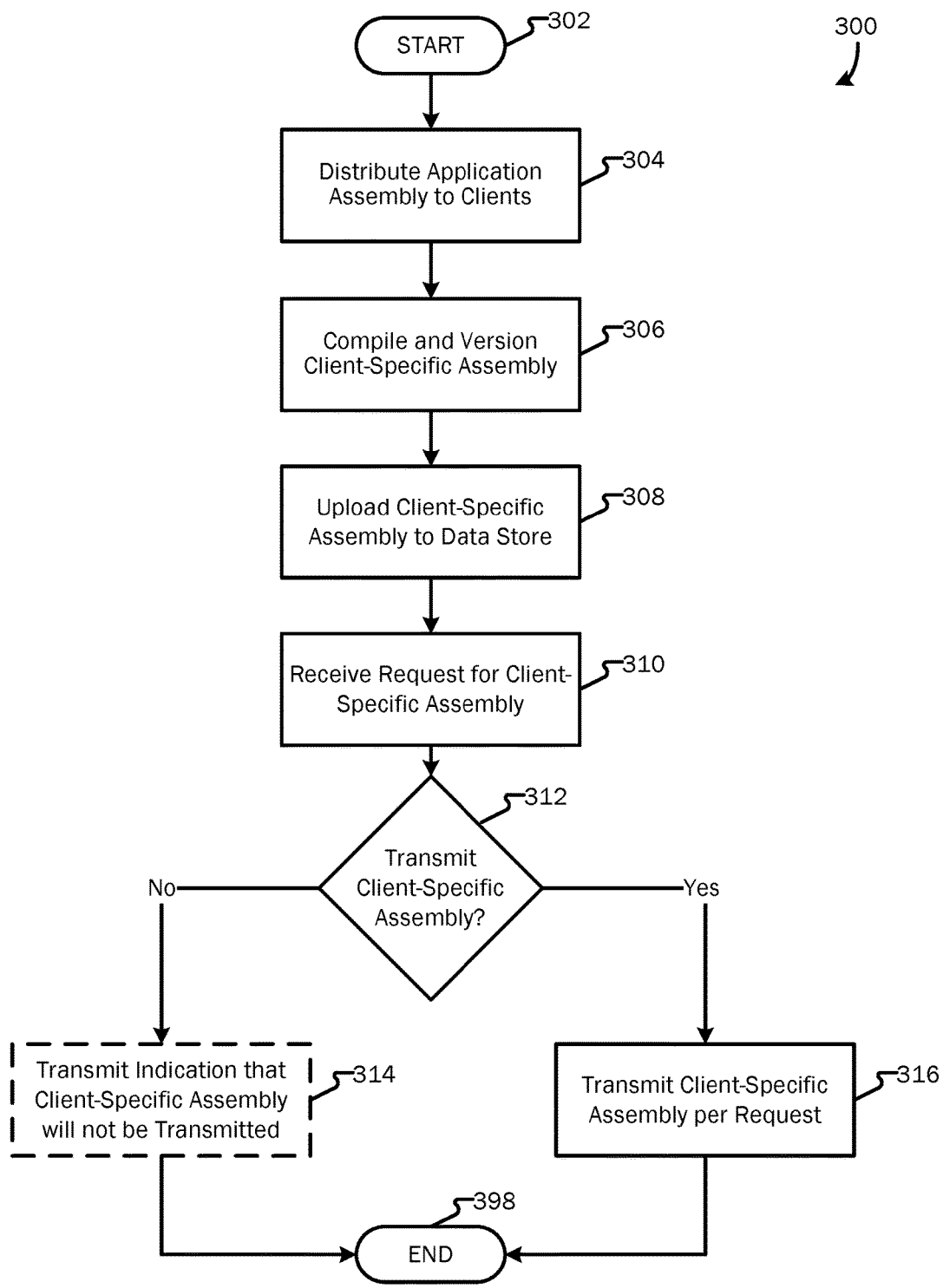
FIG. 3 is a flow chart of an example method for providing assembly management from a software provider perspective.

FIG. 3 is a flow chart of an example method 300 for providing assembly management from a software provider perspective. The method 300 starts at OPERATION 302, and proceeds to OPERATION 304, where the client application 104 comprising only those components shared by all clients 106 (e.g., application assembly 108) is distributed to each client 106 for storage locally on the associated client computing devices 204 or third party servers 118 of the plurality of client users of the client application 104.

At OPERATION 306, client-specific code is compiled into a client-specific assembly 114, versioned, and may have a subscription level (e.g., user, facility, or trading partner) assigned to it. A subscription level may be used to determine which client-specific assemblies 114 or versions thereof, a given client user is provided access to. A user level subscription may include given users or computing devices with access to the client application 104, advanced access to a version of the client application 104, such as to an IT department for testing purposes, or special access to given features or assemblies, such as a supervisor or administrator. A facility level subscription may designate a site that has a subscription to the client application 104 (e.g., a wing, a floor, a building, a campus, etc.). A trading partner subscription may designate multiple users or organizations that have access to the client application 104, locally or remotely, such as, for example, an auditor, an insurance intermediary, or a third party payor for a healthcare provider/patient transaction. In various aspects, the subscription levels may be tiered, such that the user level subscriptions may include the facility or trading partner subscription levels and additional or customized features. For example, a user subscription may be for a supervisor at a healthcare facility, which uses a facility level subscription, wherein the supervisor client may have additional features available compared to other users in the healthcare facility. A given login may include several subscription levels, for example, a user level subscription and a facility level subscription, or a facility level subscription and a trading partner level subscription, which may specify different complementary or competing client-specific assemblies 114.

At OPERATION 308 the client-specific assembly 114 is uploaded to the data store 214. Method 300 then proceeds to OPERATION 310, where a request for a client-specific assembly 114 is received from a given client user. In various aspects, the request may include a designated name or version of a client-specific assembly 114 requested, or may be for a most-recent version of a given client-specific assembly based on the subscription level of the requesting client user.

At DECISION OPERATION 312, the software service provider 102 determines, based on the client user's request and the contents of the data store 214, whether to transmit the client-specific assembly 114. In various examples, the software service provider 102 may determine that transmission of a client-specific assembly 114 is not needed when the requested name or version of a client-specific assembly 114 has yet to be complied or uploaded, a given subscription level is not associated with a client-specific assembly 114, or the requesting client 106 already has access to the requested name/version of a client-specific assembly 114 (e.g., on a local disk 208, or via a network 110 from a third party server 118).

If it is determined not to transmit the client-specific assembly 114, method 300 may optionally proceed to OPTIONAL OPERATION 314, where an indication that the client-specific assembly 114 will not be transmitted is transmitted to the requesting client 106. The method 300 then ends at OPERATION 398.

If it is determined to transmit the client-specific assembly 114, method 300 proceeds to OPERATION 316, where the client-specific assembly 114 matching the request is transmitted from the data store 214. In some aspects, the name and the version of the client-specific assembly 114 may be transmitted to the client application 104 for approval before transmitting the client-specific assembly 114, for example, to provide client users with version control when requesting a most-recent version. In various aspects, the client-specific assembly 114 may be transmitted to the client computing devices 204 or third party servers 118 for the requesting client user. In various aspects, the software service provider 102 may not have permission to write to the requesting client's disk 208, in which case the client-specific assembly 114 may be streamed to the requesting client's memory 210 for execution therefrom. Method 300 then ends at OPERATION 398.

Figure 4:
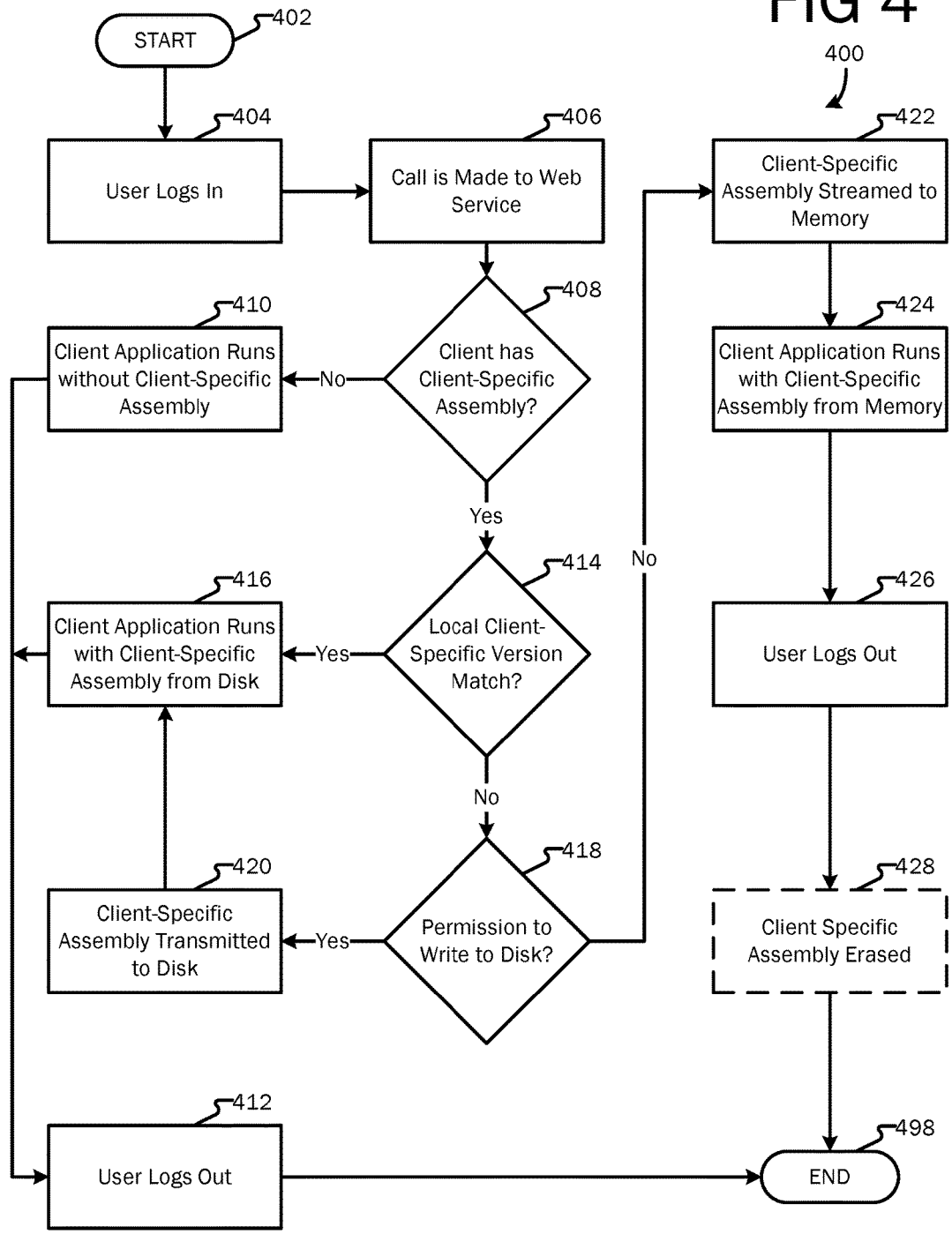
FIG. 4 is a flow chart of an example method for providing assembly management from a client perspective.

FIG. 4 is a flow chart of an example method 400 for providing assembly management from a client perspective. The method 400 starts at OPERATION 402, and proceeds to OPERATION 404, where a client user logs in to the system. Once the client user has logged in, method 400 proceeds to OPERATION 406, where a web service call is made by the client application 104 to request a response on whether a client-specific assembly 114 is available for the requesting client 106.

At DECISION OPERATION 408, the data store 214 is queried for whether the requesting client 106 is associated with a client-specific assembly 114.

If a client-specific assembly 114 is not associated with the requesting client 106, or not available for the requesting client 106, method 400 proceeds to OPERATION 410, where the client application 104 is instructed to run without a client-specific assembly 114. In various aspects, the client application 104 may receive a message to inform how the client application 104 will operate without a client-specific assembly 114. Client users may operate the client application 104 using the application assembly 108 until they log out at OPERATION 412, at which time the method 400 ends at OPERATION 498.

If a determination is made at DECISION OPERATION 408 that a client-specific assembly 114 for the requesting client 106 is available, the method 400 proceeds to DECISION OPERATION 414, where the web service 202 determines whether the requesting client 106 and the client-specific assembly 114 stored in the data store 214 are matching. In various aspects, the name and the version of the stored client-specific assembly 114 to which the requesting client 106 is subscribed are compared to those of the stored client-specific assembly 114 to determine whether the client-specific assembly 114 in the data store 214 matches the version of the client-specific assembly 114 stored locally on the client computing device 204 (or if there is an assembly 114 stored locally on the client computing device 204). For example, the client application 104 may query for the most up-to-date version of a given client-specific assembly 114 whenever a client user logs on.

If a determination is made at DECISION OPERATION 414 that the name and version of the assembly 114 in the data store 214 matches the name and version of the assembly 114 stored locally on the client computing device 204, the method 400 proceeds to OPERATION 416, where the client application 104 is run with the locally stored client-specific assembly 114. Because the client user has the requested client-specific assembly 114, the software service provider 102 will not need to transmit the client-specific assembly 114. Instead, in various aspects, the software service provider 102 may transmit a message to the client application 104 to inform it that the requested name and version of a client-specific assembly 114 is already locally stored. Client users may operate the client application 104 using the locally stored client-specific assembly 114 and the application assembly 108 until they log out at OPERATION 412, at which time the method 400 ends at OPERATION 498.

If a determination is made at DECISION OPERATION 414 that the client-specific assembly 114 in the data store 214 does not match the version of the assembly 114 stored locally on the client computing device 204 (including if there is not a locally-stored client-specific assembly 114), the method 400 proceeds to DECISION OPERATION 418, where a determination is made as to whether the software service provider 102 has permission to write to the client's disk 208.

If the software service provider 102 has permission to write to the client's disk 208, the method 400 proceeds to OPERATION 420, where the client-specific assembly 114 stored in the data store 214 is retrieved by the web server 212 through the network 110 via the web service call and committed to the client's disk 208. Method 400 then proceeds to OPERATION 416, where the client application 104 is run with the locally saved client-specific assembly 114. As long as the saved version is the current version, for example, as determined by the web service call, the client application 104 will use the locally saved client-specific assembly 114 in combination with the application assembly 108. The method 400 then proceeds to OPERATION 412, where the client user logs out, at which time the method 400 ends at OPERATION 498.

If the software service provider 102 is determined to not have permission to write to the client's disk 208 at DECI- SION OPERATION 418, the method 400 proceeds to OPERATION 422, where the client-specific assembly 114 is retrieved from the data store 214 and streamed via the web service 202 to the client 106, and is retained in the client computing device's memory 210 for the duration of the login without committing the assembly to the client's disk 208.

At OPERATION 424, the client application 104 runs with the client-specific assembly 114 from the client computing device's memory 210 until the client user logs out at OPERATION 426, the client user logs out. After the client user logs out, method 400 may optionally erase the client-specific assembly 114 from the memory 210 at OPTIONAL OPERATION 428. The method 400 then ends at OPERATION 498.

Figure 5:
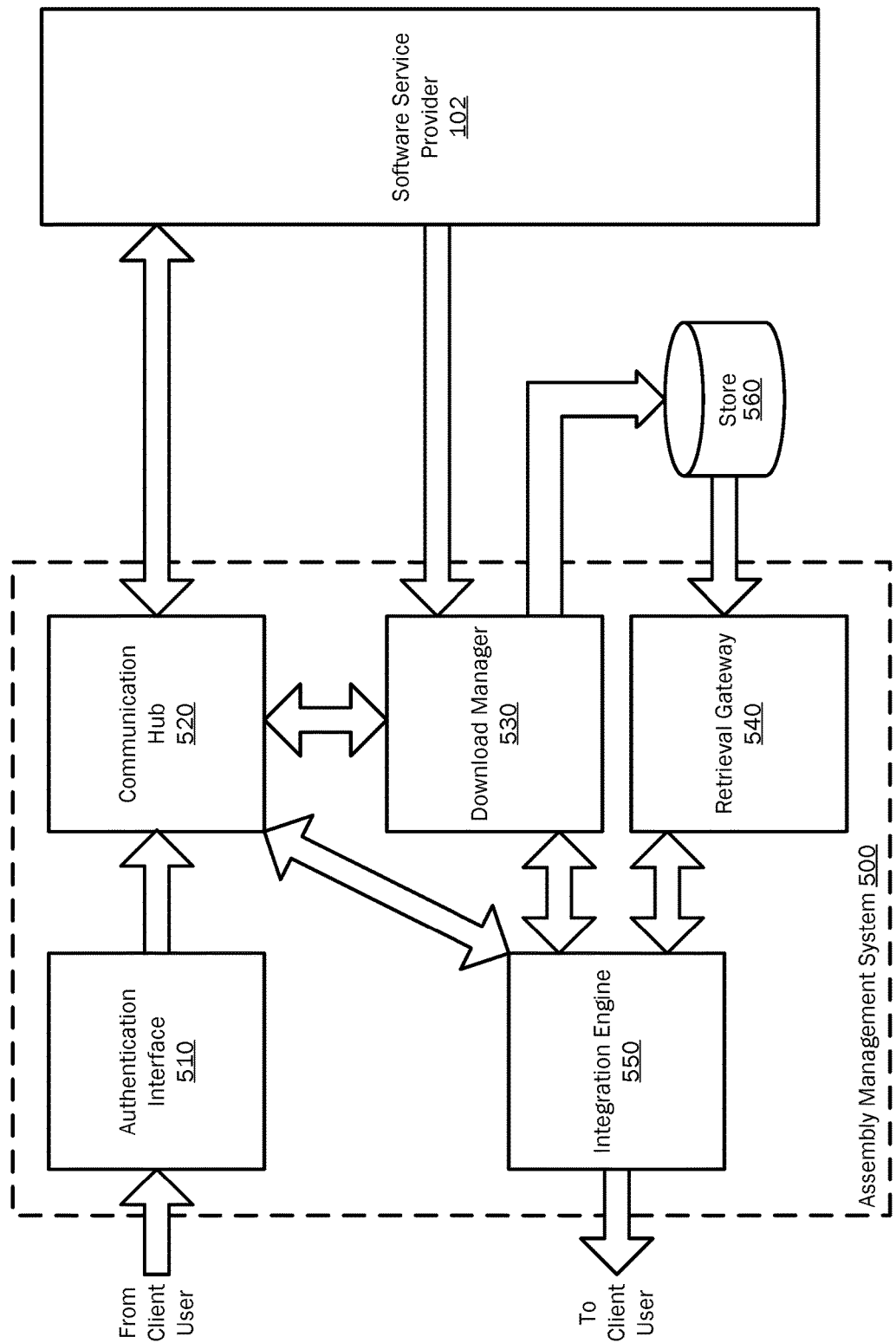
FIG. 5 is a block diagram of an example assembly manager for a client application.

FIG. 5 is a block diagram of an example assembly management system 500 for a client application 104. In various aspects, the assembly management system 500 may be provided by a software service provider 102, a client 106, a third party server 118 (e.g., a cloud service provider hosting the client application 104 remotely for the client users), or as a distributed system amongst the software service providers 102, clients computing devices 204, and third party servers 118. In FIG. 5, the assembly management system 500 is illustrated as a dashed line surrounding several components, which include an authentication interface 510, a communication hub 520, a download manager 530, a retrieval gateway 540, and an integration engine 550. Also illustrated is a local store 560, which in various aspects, includes a disk 208 or a memory 210 that are local to the client application 104. Each of the illustrated components may be provided as a separate computing device within a distributed system comprising the assembly manager or as components of a single computing device on which the assembly management system 500 is provided, which is discussed in greater detail in relation for FIG. 6.

The authentication interface 510 is operable to log a client user into the system. In various aspects, the client user may be logged in via a thick client or a thin client to the system as part of the client application 104. The authentication interface 510 is further operable to determine the subscription level or levels associated with a user that has logged in, which may include information about the application assemblies 108 and any client-specific assemblies 114 to be used with the client application 104, if any client-specific assemblies 114 are available to the client 106. This information may include the designated names and versions of the application assemblies 108 or client-specific assemblies 114 or that a most-recent version is requested. The authentication interface 510 is further operable to determine a download permission for the client computing device 204 that specifies whether any client-specific assemblies 114 may be stored to disk 208 or should be streamed to memory 210 when retrieved.

The communication hub 520 is in communication with the authentication interface 510 and is operable to verify whether the client application 104 has local access to the client-specific assemblies 114 identified by the authentication interface 510 (e.g., the client-specific assemblies 114 have already been stored to disk 208). In various aspects, the communication hub 520 is in communication with the download manager 530 and the software service provider 102 to verify whether the client-specific assembly 114 specified at login already exists in the local store 560 and if the version in the local store 560 should be updated by a different version held by the software service provider 102. In various aspects, the download permission may be communicated to the download manager 530 via the communication hub 520 when it is determined that the client-specific assembly 114 is not locally accessible and will need to be retrieved from the software service provider 102.

In various aspects, when it is determined that the client-specific assembly 114 is locally accessible, the communication hub 520 may indicate to the integration engine 550 to operate without the client-specific assembly 114 stored in memory. In other aspects, when it is determined that there is not a client-specific assembly 114 available either locally or via the software service provider 102, the communication hub 520 may indicate to the integration engine 550 to operate without a client-specific assembly 114 (e.g., with only application assemblies 108).

The download manager 530 is operable to retrieve client-specific assemblies 114 from the software service provider 102 and to store them in the store 560. Depending on the download permissions, the download manager 530 may store the client-specific assemblies 114 differently. For example, when the assembly management system 500 has permission to write to a disk 208 local to the client application 104, the client-specific assembly 114 may be downloaded to the disk 208 for long term storage and repeated access by the client application 104. In other examples, when the assembly management system 500 does not have permission to write to a disk 208 local to the client application 104, the client-specific assembly 114 may be streamed from the software service provider 102 to a memory local to the client user for temporary storage. In some aspects, when the assembly management system 500 does not have permission to write to a disk 208, it may instead use a temporary cache on the disk 208 to store the client-specific application 114 temporarily. According to aspects, the download manager 530 may delete the client-specific assembly 114 from memory 210 when a user logs out of the system.

The retrieval gateway 540 is operable to retrieve application assemblies 108 and client-specific assemblies 114 from the local store 560 that have been stored by the download manager 530. The retrieval gateway 540 is in communication with the integration engine 550, which specifies which application assemblies 108 and client-specific assemblies 114 are to be retrieved from the local store 560.

The integration engine 550 is operable to integrate the applications assemblies 108 and client-specific assemblies 114 (if any exist for a given requesting client 106) into the client application 104 to provide to the client user. In aspects where multiple versions of a client-specific assembly 114 exist for a client 106, the integration engine 550 is operable to communicate to the retrieval gateway 540 which assemblies to retrieve for the integration engine 550 to use. For example, a client user may be associated with a subscription level that indicates a facility level subscription and a user level subscription, which indicate different versions of a client-specific assembly 114 to integrate into the application assemblies 108, such as, for example, a user from an IT department may have user level subscriptions that indicate test versions, whereas the rest of the users at the IT-user's facility may have facility level subscriptions that indicate production versions.

Figure 6:
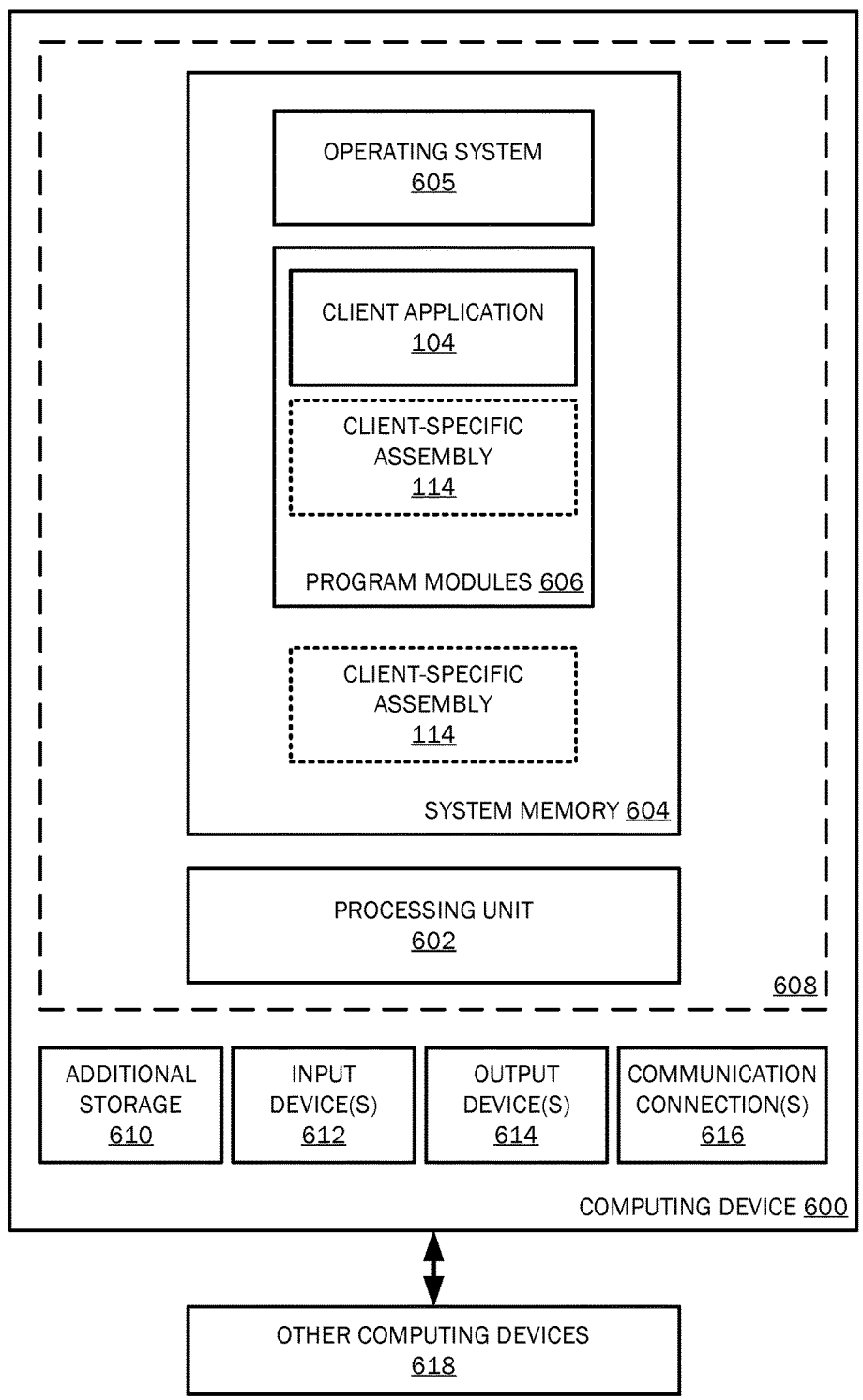
FIG. 6 is a block diagram of a computing device with which assembly management may be practiced.

As used herein, the term "module" is used to describe an individual computing device having a processor, memory, and other computer components as discussed in further detail in relation to FIG. 6. In various aspects, the functions ascribed to the modules are provided by operating instructions hardcoded into the modules, or computer executable instructions executed by the processor. Alternatively, the term "module" represents the set of software instructions stored by a memory storage device that are executed by the processor to perform the function described herein. Each of the modules described above may operate independently on a separate computer system in communication with the other modules or two or modules may be integrated within a single computer system.

Aspects of the present disclosure may be implemented via local and remote computing and data storage systems. Such memory storage and processing units may be implemented in a computing device, such as computing device 600. Any suitable combination of hardware, software, or firmware may be used to implement the memory storage and processing unit. For example, the memory storage and processing unit may be implemented with computing device 600 or any other computing devices 618, in combination with computing device 600, wherein functionality may be brought together over a network in a distributed computing environment, for example, an intranet or the Internet, to perform the functions as described herein. Such systems, devices, and processors (as described herein) are examples and other systems, devices, and processors may comprise the aforementioned memory storage and processing unit, consistent with aspects of the present disclosure.

FIG. 6 is a block diagram of a computing device with which assembly management may be practiced. The computing device 600 may include at least one processing unit 602 and a system memory 604. The system memory 604 may comprise, but is not limited to, volatile (e.g. random access memory (RAM)), non-volatile (e.g. read-only memory (ROM)), flash memory, or any combination. System memory 604 may include operating system 605, one or more programming modules 606, and may include the client application 104, which when executed, performs functionalities as described herein. According to an aspect, the client-specific assembly 114 may either be committed to storage or retained in memory for the duration of a client user login. Operating system 605, for example, may be suitable for controlling the operation of computing device 600. Furthermore, aspects of the present disclosure may be practiced in conjunction with a graphics library, other operating systems, or any other application program and is not limited to any particular application or system. This basic configuration is illustrated by those components within a dashed line 608. Computing device 600 may also include one or more input device(s) 612 (keyboard, mouse, pen, touch input device, etc.) and one or more output device(s) 614 (e.g., display, speakers, a printer, etc.).

The computing device 600 may also include additional data storage devices 610 (removable and/or non-removable) such as, for example, magnetic disks, optical disks, or tape. Computing device 600 may also contain a communication connection 616 that may allow device 600 to communicate with other computing devices 618, such as over a network in a distributed computing environment, for example, an intranet or the Internet. Communication connection 616 is one example of communication media.

Program modules, such as the client application 104, may include routines, programs, components, data structures, and other types of structures that may perform particular tasks or that may implement particular abstract data types. Moreover, aspects of the present disclosure may be practiced with other computer system configurations, including hand-held devices, multiprocessor systems, microprocessor-based or programmable user electronics, minicomputers, mainframe computers, and the like. Aspects of the present disclosure may also be practiced in distributed computing environments where tasks are performed by remote processing devices that are linked through a communications network. In a distributed computing environment, program modules may be located in both local and remote memory storage devices.

Furthermore, aspects of the present disclosure may be practiced in an electrical circuit comprising discrete electronic elements, packaged or integrated electronic chips containing logic gates, a circuit utilizing a microprocessor, or on a single chip containing electronic elements or microprocessors. Aspects of the present disclosure may also be practiced using other technologies capable of performing logical operations such as, for example, AND, OR, and NOT, including but not limited to mechanical, optical, fluidic, and quantum technologies. In addition, aspects of the present disclosure may be practiced within a general purpose computer or in any other circuits or systems.

Aspects of the present disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, the present disclosure may be embodied in hardware and/or in software (including firmware, resident software, microcode, etc.). In other words, embodiments of the present disclosure may take the form of a computer program product on a computer-usable or computer-readable storage medium having computer-usable or computer-readable program code embodied in the medium for use by or in connection with an instruction execution system.

Although embodiments of the present disclosure have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data and/or computer-executable instructions readable by a computing device. Computer-readable storage medium do not include communications media.

Aspects of the present disclosure may be utilized in various distributed computing environments where tasks are performed by remote processing devices that are linked through a communications network.

The description and illustration of one or more embodiments provided in this application are intended to provide a complete thorough and complete disclosure the full scope of the subject matter to those skilled in the art and not intended to limit or restrict the scope of the present disclosure as claimed in any way. The aspects, examples, and details provided in this application are considered sufficient to convey possession and enable those skilled in the art to practice the best mode of the present disclosure as claimed. Descriptions of structures, resources, operations, and acts considered well-known to those skilled in the art may be brief or omitted to avoid obscuring lesser known or unique aspects of the subject matter of this application. The present disclosure should not be construed as being limited to any embodiment, example, or detail provided in this application unless expressly stated herein. Regardless of whether shown or described collectively or separately, the various features (both structural and methodological) are intended to be selectively included or omitted to produce an aspect with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept embodied in this application that do not depart from the broader scope of the present disclosure as claimed.

We claim:

1. A system for improving the functionality of a computing system by providing assembly management of a client application of a client computing device, the system comprising:
    a hardware processor; and
    a memory device including instructions, which when executed by the hardware processor cause the system to provide:
    an authentication interface, operable to log a user into the system and determine a subscription level and a download permission associated with the user, wherein the subscription level includes a user level subscription and a facility level subscription that include information on the client application, application assemblies, and any client-specific assemblies, wherein the application assemblies are shared by a plurality of users and additionally client-specific assemblies can be provided to a particular user and
    wherein the user level subscription and the facility level subscription are used to determine a version of the client-specific assembly to provide to the logged-in user, and wherein the download permission specifies whether the client-specific assembly is to be stored on a long-term storage local to the client computing device or a short-term storage local to the client computing device when retrieved;
    a communication hub, operable to verify with a software service provider whether the client application has local access to the client-specific assembly based on the logged-in user;
    a download manager, operable to retrieve the client-specific assembly from the software service provider and store the client-specific assembly, wherein the client-specific assembly is stored in accordance with the download permission, wherein if access to write to the long-term storage local to the client computing device is permitted, store the client-specific assembly to the long-term storage local to the client computing device, and otherwise, store the client-specific assembly to the short-term storage local to the client computing device for a login duration of the particular user;
    a retrieval gateway, operable to retrieve the application assemblies and the client-specific assembly stored by the download manager; and
    an integration engine in communication with the retrieval gateway to specify the client-specific assembly to be retrieved, wherein the integration engine is operable to integrate the client-specific assembly and application assemblies into the client application for provision to the client computing device.

2. The system of claim 1, wherein a disk that the download manager stores the client-specific assembly on is provided by a third party server providing the client application remotely to the user.

3. The system of claim 1, wherein the subscription level further includes a trading partner level subscription, wherein the trading partner level subscription is used to determine the version of the client-specific assembly to provide to the logged-in user.

4. The system of claim 1, wherein the user level subscription designates a first version of the client-specific assembly and the facility level subscription designates a second version of the client-specific assembly.

5. The system of claim 4, wherein the integration engine is operable to communicate to the retrieval gateway whether to retrieve the first version or the second version of the client-specific assembly based on the user level subscription.

6. The system of claim 1, wherein the communication hub is further operable to verify with the software service provider whether the logged in user is associated with any client-specific assemblies, and if not, communicate to the integration engine to provision the application assemblies to the user.

7. The system of claim 1, wherein the communication hub is further operable to communicate to the download manager that the client application does not have local access to the client-specific assembly and signal the download manager to retrieve the client-specific assembly from the software service provider.

8. The system of claim 1, wherein the download manager is further operable to erase the client-specific assembly from a memory local to the client computing device in response to the user logging out.

9. The system of claim 1, wherein the download manager is further operable to store the client-specific assembly in a temporary cache on a disk local to the client computing device when the download permission specifies that the client-specific assembly is stored on a memory local to the client computing device.

10. A non-transitory computer readable storage medium that includes executable instructions that improve functionality of a computing system by providing assembly management of a client application of a client computing device which, when executed:
    use an authentication interface to log a user into the computer system and determine a subscription level and a download permission associated with the user, wherein the subscription level includes a user level subscription and a facility level subscription that include information on the client application, application assemblies, and any client-specific assemblies, wherein the application assemblies are shared by a plurality of users and additionally client-specific assemblies can be provided to a particular user and wherein the user level subscription and the facility level subscription are used to determine a version of the client-specific assembly to provide to the logged-in user, and wherein the download permission specifies whether the client-specific assembly is to be stored on a long-term storage local to the client computing device or a short-term storage local to the client computing device when retrieved;
    use a communication hub to verify with a software service provider whether the client application has local access to the client-specific assembly based on the logged-in user;
    use a download manager to retrieve the client-specific assembly from the software service provider and store the client-specific assembly, wherein the client-specific assembly is stored in accordance with the download permission, wherein if access to write to the long-term storage local to the client computing device is permitted, store the client-specific assembly to the long-term storage local to the client computing device, and otherwise, store the client-specific assembly to the short-term storage local to the client computing device for a login duration of the particular user;

use a retrieval gateway to retrieve the application assemblies and the client-specific assembly stored by the download manager; and use an integration engine in communication with the retrieval gateway to specify the client-specific assembly to be retrieved, wherein the integration engine is operable to integrate the client-specific assembly and application assemblies into the client application for provision to the client computing device.

11. The computer readable medium of claim 10, wherein a disk that the download manager stores the client-specific assembly on is provided by a third party server providing the client application remotely to the user.

12. The computer readable medium of claim 10, wherein the subscription level further includes a trading partner level subscription, wherein the trading partner level subscription is used to determine the version of the client-specific assembly to provide to the logged-in user.

13. The computer readable medium of claim 10, wherein the user level subscription designates a first version of the client-specific assembly and the facility level subscription designates a second version of the client-specific assembly.

14. The system of claim 13, wherein the integration engine is operable to communicate to the retrieval gateway whether to retrieve the first version or the second version of the client-specific assembly based on the user level subscription.

15. The computer readable medium of claim 10, wherein the communication hub is further operable to verify with the software service provider whether the logged in user is associated with any client-specific assemblies, and if not, communicate to the integration engine to provision the application assemblies to the user.

16. The computer readable medium of claim 10, wherein the communication hub is further operable to communicate to the download manager that the client application does not have local access to the client-specific assembly and signal the download manager to retrieve the client-specific assembly from the software service provider.

17. The computer readable medium of claim 10, wherein the download manager is further operable to erase the client-specific assembly from a memory local to the client computing device in response to the user logging out.

18. The computer readable medium of claim 10, wherein the download manager is further operable to store the client-specific assembly in a temporary cache on a disk local to the client computing device when the download permission specifies that the client-specific assembly is stored on a memory local to the client computing device.

19. A method to improve functionality of a computing system by providing assembly management of a client application of a client computing device by:

using an authentication interface to log a user into the computer system and determine a subscription level and a download permission associated with the user, wherein the subscription level includes a user level subscription and a facility level subscription that include information on the client application, application assemblies, and any client-specific assemblies, wherein the application assemblies are shared by a plurality of users and additionally client-specific assemblies can be provided to a particular user and wherein the user level subscription and the facility level subscription are used to determine a version of the client-specific assembly to provide to the logged-in user, and wherein the download permission specifies whether the client-specific assembly is to be stored on a long-term storage local to the client computing device or a short-term storage local to the client computing device when retrieved;

using a communication hub to verify with a software service provider whether the client application has local access to the client-specific assembly based on the logged-in user;

using a download manager to retrieve the client-specific assembly from the software service provider and store the client-specific assembly, wherein the client-specific assembly is stored in accordance with the download permission, wherein if access to write to the long-term storage local to the client computing device is permitted, storing the client-specific assemble to the long-term storage local to the client computing device, and otherwise, storing the client-specific assembly to the short-term storage local to the client computing device for a login duration of the particular user;

using a retrieval gateway to retrieve the application assemblies and the client- specific assembly stored by the download manager; and using an integration engine in communication with the retrieval gateway to specify the client-specific assembly to be retrieved, wherein the integration engine is operable to integrate the client-specific assembly and application assemblies into the client application for provision to the client computing device.

20. The method of claim 19, wherein the user level subscription designates a first version of the client-specific assembly and the facility level subscription designates a second version of the client-specific assembly.

* * * * *

UNITED STATES PATENT AND TRADEMARK OFFICE
CERTIFICATE OF CORRECTION

PATENT NO. : 10,237,262 B2
APPLICATION NO. : 15/845816
DATED : March 19, 2019
INVENTOR(S) : Michael Peter Ochs Page 1 of 1

It is certified that error appears in the above-identified patent and that said Letters Patent is hereby corrected as shown below:

In the Claims

Column 15, Line 27, Claim 14: "The system of claim 13," should read --The computer readable medium of claim 13,--

Signed and Sealed this
Twenty-second Day of October, 2019

Andrei Iancu
*Director of the United States Patent and Trademark Office*